Figure 1A:
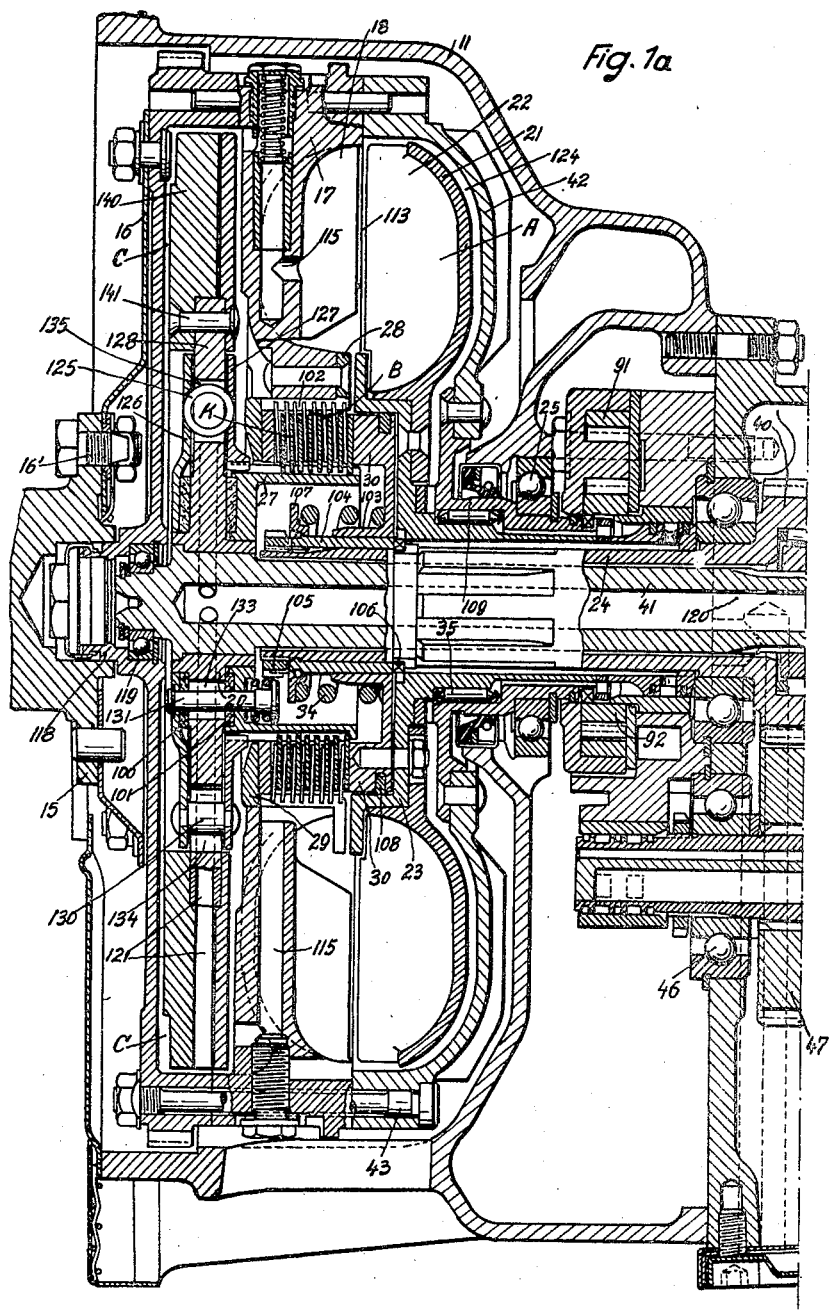

July 5, 1960 HANS-JOACHIM M. FÖRSTER 2,943,503
AUTOMOBILE TRANSMISSION
Filed June 17, 1953 3 Sheets-Sheet 2
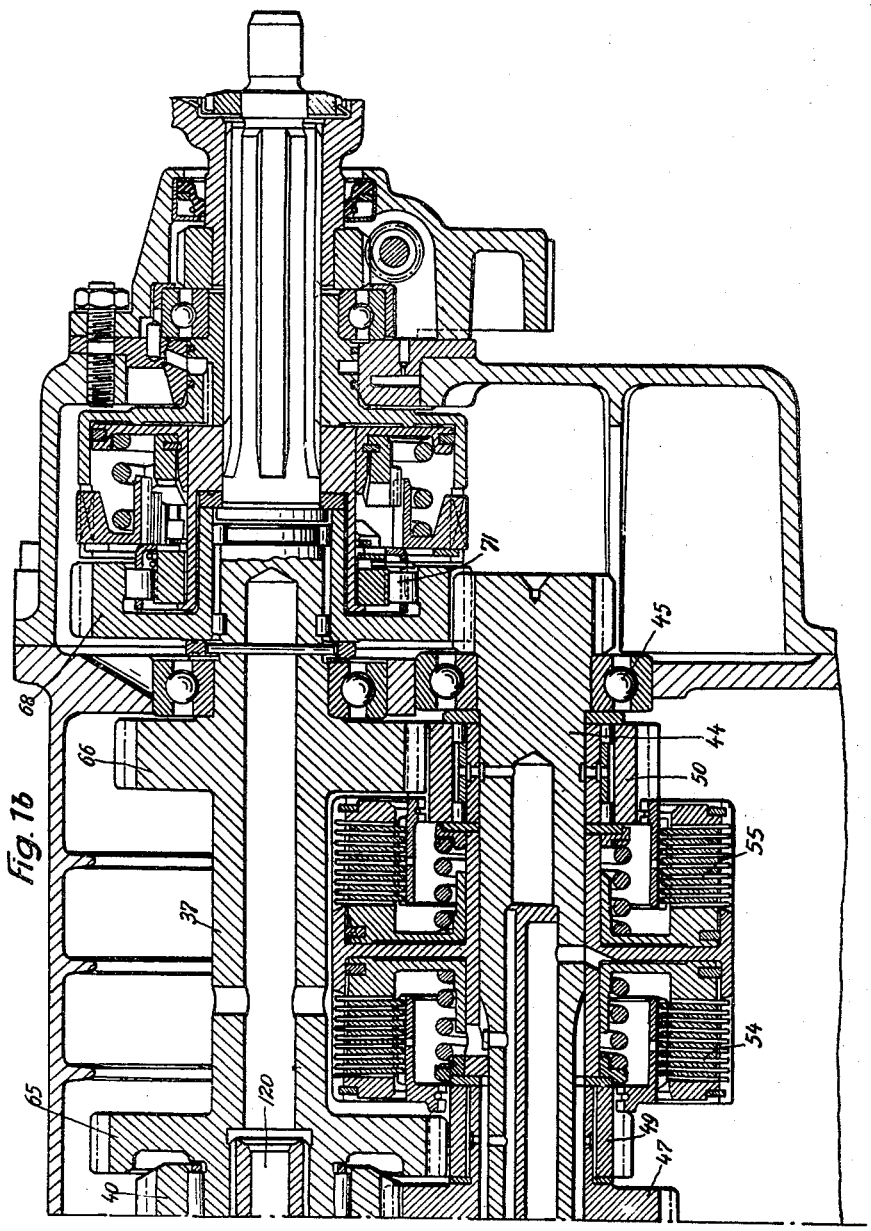
*Inventor:*
HANS-JOACHIM M. FÖRSTER.
*ATTORNEYS.*

July 5, 1960  HANS-JOACHIM M. FÖRSTER  2,943,503
AUTOMOBILE TRANSMISSION
Filed June 17, 1953  3 Sheets-Sheet 3
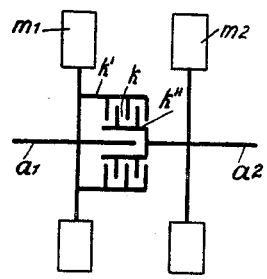
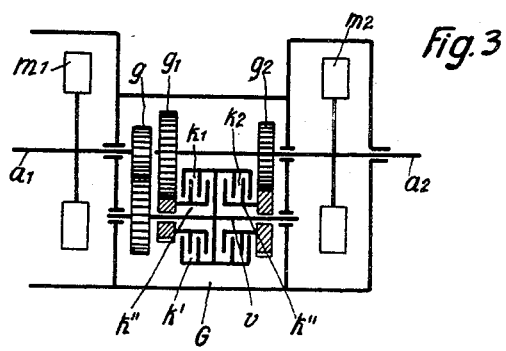
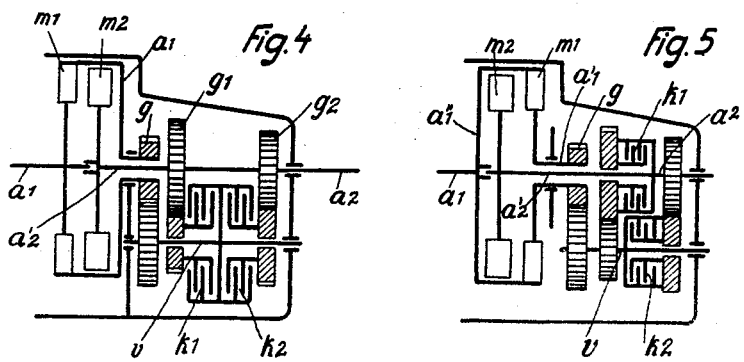
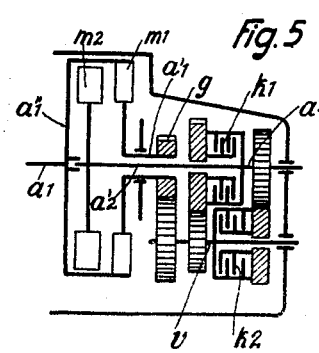
Inventor:
HANS-JOACHIM M. FÖRSTER.
Dicke, Padlon and Craig
ATTORNEYS.

United States Patent Office 2,943,503
Patented July 5, 1960

2,943,503
AUTOMOBILE TRANSMISSION

Hans-Joachim M. Förster, Stuttgart-Bad Cannstatt, Germany, assignor to Daimler-Benz Aktiengesellschaft, Stuttgart-Unterturkheim, Germany Filed June 17, 1953, Ser. No. 362,359

Claims priority, application Germany June 20, 1952

22 Claims. (Cl. 74—359)

My invention relates to an automobile transmission and, more particularly, to transmissions including disengageable friction clutches adapted to render various sets of gears operative or inoperative to change the ratio of transmission. More especially, my invention concerns a transmission of that kind in which the friction clutches are of the multi-disk type.

Experience has shown that when the friction clutches are engaged or disengaged, they are likely to "chatter," i.e. to produce rotary vibrations which originate from the tendency of the friction elements, such as disks, to alternately stick to each other and to be torn loose again by the momentum to be transferred. This chattering which is particularly liable to occur with clutches of the multi-disk type may be so powerful as to shake the entire body of the automobile. Experience has shown that this phenomenon is the more likely to occur the smoother the clutches will be engaged and disengaged, i.e. the longer the disks are partially engaged for relative slippage under power. While the tendency of a clutch to chatter depends to a certain extent on the nature of the materials employed and on the finish of the faces, even a proper selection of such factors cannot entirely eliminate the chattering.

It is the object of the present invention to provide a transmission including ratio changing clutches which are not liable to chatter. I found that this object will be attained by connecting both the driving member and the driven member of the friction clutch with a flywheel or a similar mass having a high inertia, particularly in such a manner that a stiff connection free from resiliency exists between the friction member and the associated flywheels. The flywheel or other mass may be disposed directly in front of or behind the clutch or may be disposed at a distance therefrom provided that the flywheel is very rigidly connected with the clutch so that the inertia will positively control the clutch.

Where the invention is applied to a transmission including a hydrodynamic clutch, the flywheel connected with one member of a friction clutch is preferably formed by one of the two members of the hydrodynamic clutch, and the flywheel connected to the other member of the friction clutch is preferably disposed in direct vicinity of the hydrodynamic clutch, for instance, between the latter and the engine. Also, it has been found useful to construct such flywheel as a scooping member adapted to scoop the liquid in the hydrodynamic clutch out of the working chamber of the same.

Where the flywheel revolves within a liquid, it is preferably provided with an anti-friction coating, such as a chromium plating.

In the accompanying drawings I have shown a number of embodiments of my invention, but I wish it to be clearly understood that the invention is not limited to the particular details of construction or the particular arrangements of parts here shown as the transmission embodying the invention may take various other forms. It is also to be understood that the terminology or phraseology herein used is for purposes of description and not of limitation as the scope of the present invention is denoted by the appended claims. In the drawings, Figures 1a and 1b are axial sections taken through an automobile transmission adapted by selective actuation of multi-disk friction clutches to be set to four different speed ratios, Fig. 2 is a diagrammatic representation of the principles underlying my invention, Fig. 3 is a diagrammatic representation of a modification of the transmission shown in Fig. 1, Fig. 4 is a diagrammatic representation of a transmission similar but slightly modified with respect to that shown in Fig. 3, and Fig. 5 is a diagrammatic representation of a modification of the transmission shown in Fig. 4.

In Figures 1a and 1b I have shown my invention incorporated in an automobile transmission of the type shown and described in my copending application Serial No. 245,131 filed on September 5, 1951, now Patent No. 2,756,616, dated July 31, 1956. Since reference may be had to such application for a detailed disclosure of the transmission, it is believed to be sufficient to limit the detailed description hereinafter to the front portion of the transmission including the hydrodynamic device and the associated friction clutch, whereas the rear portion of the transmission including the sets of gears and the associated clutches will be but briefly described.

In order to facilitate a reference to the cited prior application I have used the same reference numerals as in the latter to denote similar parts.

The crankshaft of the internal combustion engine has a rear flange 15. A disk 16 is connected with the flange 15 by threaded bolts 16' and carries the driving member 17 of a hydrodynamic clutch of customary design. The member 17 cooperates with the driven member 21 of the hydrodynamic clutch to form a substantially annular working chamber A. For that purpose, the member 17 has the shape of a hollow semi-annulus provided with internal vanes 18. The driven member 21 has the shape of a supplemental semi-annulus having internal vanes 22. In the present embodiment, the disk 16 is formed by a more or less flexible sheet metal plate.

The driven member 21 of the hydrodynamic clutch is fixed on a hub member 23 seated on a hollow shaft 24 and splined therewith for common rotation. A friction clutch K is provided for the purpose of positively connecting the driving member 17 of the hydrodynamic clutch with the outgoing shaft of the transmission referred to hereinafter. For this purpose, a hub 20 is splined on the left end of an axial shaft 41 which is disposed within the hollow shaft 24 and is rigidly connected with the outgoing driven shaft 37 of the transmission. The hub 20 is integral with a circular disk 128 on which a pair of washers 100 and 101 of friction material are placed. Such washers serve the purpose of frictionally connecting the disk 128 and the flange of a substantially cylindrical drum 27 for common rotation in a manner to be described later.

The drum 27 is positioned inside of the driving member 17 of the hydrodynamic clutch and is splined on its outside for engagement with internal teeth of alternate disks of a stack of friction disks. The other disks of that stack have external teeth engaging splines 102 of a flanged member 28 which is inserted in and bolted to the driving member 17 of the hydrodynamic clutch. It will be noted that the inner periphery of member 17 is substantially cylindrical and engages over the drum-shaped splined portion of member 28. This member is integral with a flange 29. Thus, the drum-shaped portion of member 28, the flange 29, and the drum 27 confine an annular space B which is surrounded by and communicates with the chamber A of the hydrodynamic device. In fact, the splines 102 may be separated by radial slots and may thus constitute separate arms interconnected by both the flange 29 and by the outer flange of the member 28.

An annular piston 30 which is axially movable confines the annular space of the friction clutch at the right. Therefore, movement of piston 30 to the left with reference to Fig. 1 will compress the disks splined on drum 27 alternating with the disks splined on member 28 and will thus cause the driving member 17 of the hydrodynamic device to be frictionally clutched to drum 27 which, in its turn, is connected with member 20, 128 and shaft 41 for common rotation.

The piston 30 is integral with a hub portion 103 slidably mounted on a bushing 104 which, in its turn, is seated on and fixed to the hollow shaft 24 being held in engagement by a nut 105 with a collar 106 engaging a shoulder of the hollow shaft 24. Between the nut 105 and the bushing 104 an annular plate 107 is interposed serving as an abutment for a helical spring 34 which acts on piston 30 tending to keep the same in the clutch-disengaging position. The piston 30 has a peripheral groove accommodating a piston ring 108 which engages a cylindrical portion of hub member 23. When fluid under pressure is admitted through a duct not shown to the space between the piston 30 and the radially extending portion of hub member 23, the piston will be forced to the left thereby engaging the friction clutch.

On the hub member 23 a rotary member 109 is journalled by means of needle rollers 35. An annular cover plate 42 is fixed to the member 109 and by bolts 43 to the peripheral flange of the driving member 17 of the hydrodynamic device. The member 109 is journalled by a ball bearing 25 in the transmission housing 11.

As shown in Figures 1a and 1b, the end of the hollow shaft 24 carries a pinion 40 meshing with a gear 47 fixed to an auxiliary shaft 44. The latter exends parallel to the hollow shaft 24 being journalled in bearings 45 and 46 disposed in transverse walls of the transmission housing 11. Two gears 49 and 50 are rotatably mounted on shaft 44 and adapted to be individually and selectively clutched thereto for common rotation therewith by multi-disk friction clutches 54 and 55. The gear 49 is in constant mesh with a gear 65 and the gear 50 is in constant mesh with a gear 66. The gears 65 and 66 are fixed to the shaft 37 which is rigidly connected with shaft 41 and constitutes the outgoing driven shaft of the transmission. A third gear 68 disposed on shaft 37 is freely rotatably mounted thereon and adapted to be clutched thereto by a one-way clutch 71.

When all three friction clutches are disengaged the transmission is set for the lowest speed, i.e. first speed, the power being transmitted from the engine flange 15 through the hydrodynamic clutch 17, 21 to hub member 23 and from there to the hollow shaft 24, gears 40 and 47, shaft 44 and gear 67 to gear 68 and through the one-way clutch 71 to the driven shaft 37.

When clutch 55 only is engaged the power is transmitted through the elements 15, 17, 21, 23, 24, 40, 47, and 44 as described heretofore and thence via clutch 55, gears 50 and 66 to shaft 37 which will revolve at a higher speed thus overtaking gear 68.

Engagement of clutch 54 in lieu of clutch 55 results in the setting of the transmission for the third speed, the power being transmitted from engine flange 15 in the manner described through the hydrodynamic device to shaft 44 and from there via clutch 54, gear 49 and gear 65 to the driven shaft 37.

When the two friction clutches 54 and 55 are disengaged and the friction clutch in space B is engaged, the transmission is set to fourth or direct speed, the power being transmitted from the engine flange 15 through disk 16, clutch member 17, splined member 28, 102, 29, stack of disks K, drum 27, friction washers 100, 101, flanged hub 20, shaft 41, driven shaft 37.

It will be noted that the annular cover plate 42 and the driving member 17 of the hydrodynamic device constitute a rotating casing. The liquid, such as oil, which fills the hydrodynamic device is supplied to the interior of such casing through a gear pump comprising an internally toothed gear 91 mounted for rotation on the transmission housing and an externally toothed gear 92 meshing with the same and mounted on the hub member 109 which is rigid with the driving member 17 of the hydrodynamic device. The gear pump feeds oil through a duct (not shown) to the space 124 left between the driven member 21 of the hydrodynamic device and the plate 42 and hub member 109 thereof. This space in turn communicates with the working chamber A through a gap 113 provided between the opposed faces of the driving member 17 and the driven member 21. The surplus fed by pump 91, 92 will be discharged from chamber A through one or more overflow ducts 115 which establish a communication of chamber A with a chamber C. The chamber C is formed by a cover 116 connected by bolts 43 to the driving member 17 and provided with a hub portion 118 which engages an internal bore of the crankshaft being centered therein. The hub member 118 encloses a ball bearing 119 in which the front end of shaft 41 is journalled.

For the purpose of controlling the radius of the level of the rotating liquid filling the spaces A, B and C I have provided a rotary scooping member which will withdraw the liquid discharged from the ducts 115 into space C and will return such liquid through the axial bore 120 of shaft 41 into the sump provided at the bottom of the transmission casing from which pump 91, 92 is supplied with liquid.

The rotary scooping member is formed by the hub 20 and the disk 128 which for the purpose of withdrawing the liquid from chamber C is provided with one or more substantially radial ducts 121 extending from the axial bore 120 of shaft 41.

Preferably, a smooth oil-repelling coating, such as a chromium plating or a coat of special lacquer, is provided on the disk 128 in order to reduce the friction between the same and the liquid filling of chamber C.

The connection of the scooping member 20, 128 with the drum 27 will now be described in detail. The plane circular disk 128 having a plurality of, e.g. four, radial ducts 121 is positioned between a circular plate 127 and a disk 126 which are connected by spacing bolts 130 riveted thereto. The plate 127 is splined on drum 27 for common rotation. The washers 100 and 101 of friction material are interposed between disk 126, scooping member 128 and flange of drum 27. Means are provided to firmly press the two washers upon the member 128. To this end, a plurality of circumferentially distributed bolts 131 extend parallel to the axis of the transmission through the flange of drum 27 and the washers 100 and 101 and the disk 126 imposed on washer 100 and carry helical springs 132 producing the required pressure. The bolts 131 and the spacing bolts 130 have ample play within holes 133 and 134 provided in the disk 128 thus permitting of a limited relative oscillation of the drum 27 and the scooping member 20, 128, such rotation being counteracted by the friction produced by the washers 100 and 101. In order to resiliently restore the parts 20 and 27 to the normal relative angular position, a plurality of circumferentially distributed pockets 135 are cut into the disk 128, the plate 127 and the disk 126. Each of such pockets accommodates a helical spring 125 which will be compressed by the described relative oscillation. It is to be understood, of course, that such pockets are disposed between the four ducts 121. In this way, the elements 126, 127, 128 constitute a vibration absorber which tends to absorb any rotary oscillations set up in the clutch K.

Such oscillations are liable to arise on account of the tendency of the friction disks of clutch K when they start to grip under pressure by piston 30 to alternately bind and to resume relative motion and then to bind again. This phenomenon is known as "chattering" of the clutch, since it produces a chattering noise. The externally toothed friction disks engaging the splines 102 are constrained by the momentum of the comparatively heavy member 17 to revolve at a uniform speed. Therefore, the chattering will tend to impart a fluctuating rotary speed to the internally toothed disks splined to drum 27. Since the momentum of drum 27 and the parts frictionally connected therewith, to wit the disks 128, the hub 20 and the shaft 41, is negligible compared with that of member 17, it could happen that such elements would partake in the vibration. In other words, unless special precautions were taken it might happen that the drum 27 would perform its fluctuating rotation in unison with the elements 20, 41 and 128 and in that event there would be no shock absorbing friction produced between the washers 100 and 101 and the disk 128.

To overcome that difficulty and to render the shock absorber more effective I have mounted and attached a heavy composite ring 140 to the periphery of disk 128, such ring being composed of two sections riveted to one another and to the disk 128 by rivets 141. Since the ring 140 has a larger diameter and a greater weight than the disk 128 it will considerably increase the inertia of the disk 128 and will thus prevent same from partaking in any oscillations to which drum 27 may be possibly subjected by the chattering of clutch K.

The scooping ducts 121 are extended by radial bores of ring member 140 to the periphery thereof, as will appear from Fig. 1.

From the foregoing description of the transmission shown in Fig. 1 it will appear that each of the two clutch sections including the parts 27 and 28 and the associated sets of friction disks is connected with a separate flywheel which is connected for common movement therewith, the flywheel connected to the clutch section 27 being formed by the heavy ring 140, while the flywheel connected to clutch section 28 is formed by the driving member 17 and the cover 42 bolted thereto.

Similarly, the friction clutches 54 and 55 are also protected against chattering by the flywheel effects of the heavy ring 140, constituting one flywheel, and by the driving member 17 and the cover 42, constituting the other flywheel.

This will become quite obvious by reference to Figure 4 which illustrates schematically substantially the transmission described in detail with reference to Figures 1a and 1b.

The flywheel effect of the ring 140 is directly transmitted through hub 20, shaft 41, gear 65 and gear 49 to one half of the clutch 54. The flywheel effect of driving member 17 and cover 42 is transmitted to the other half of the clutch through shaft 24, gear 40, gear 47, and the counter shaft 44.

One half of the clutch 55 is again connected with the flywheel 140 through hub member 20, shaft 41, shaft 37, gear 66, and gear 50. The other half of clutch 55 is connected with the flywheel effect of element 17 and cover plate 42 through shaft 24, gear 40, gear 47 and the counter shaft 44.

This anti-chatter effect of the flywheels with reference to friction clutches 54 and 55 will be more fully described hereinafter with reference to Figure 4.

In Figs. 2, 3, 4 and 5, $a1$ denotes the driving shaft, $a2$ denotes the driven shaft, $k$, $k1$, $k2$ denote the multi-disk friction clutches, $m1$ denotes a flywheel connected with one element of the friction clutch and $m2$ denotes a flywheel connected with the other element of the friction clutch. It will be noted that in Fig. 2 the clutch $k$ is directly interposed between the flywheels $m1$ and $m2$ and is adapted to connect the same for common rotation.

Thus, element $k'$ of the clutch $k$ is connected with the flywheel $m1$ and the other element $k''$ of the clutch $k$ is connected with the flywheel $m2$. The term "flywheel" as herein used includes any rotary mass having a high inertia compared with that of the clutch element.

In the transmission G illustrated in Fig. 3 a secondary shaft $v$ and two sets $g1$ and $g2$ of gears transfer power between the two flywheels $m1$ and $m2$, multi-disk friction clutch $k1$ and $k2$ being disposed on the secondary shaft $v$. In this embodiment, the clutch element $k'$ common to both sets $g1$ and $g2$ of gears is positively connected for simultaneous and proportional rotation with the flywheel $m1$ through the intermediary of the secondary shaft $v$ and a pair of gears $g$, one gear of such pair being fixed to shaft $v$ and the other gear thereof being fixed to shaft $a1$ to which the flywheel $m1$ is attached. The two other clutch sections $k''$ are connected to the flywheel $m2$ through the intermediary of either the pair of gears $g1$ or the pair of gears $g2$ and the shaft $a2$, the latter being fixed to the flywheel $m2$ and one gear of each of the pairs $g1$ and $g2$, while the other gear of each pair is fixed to the associated clutch element $k''$.

The embodiment shown in Fig. 4 differs from that shown in Fig. 3 substantially by a forward extension $a'2$ of the driven shaft $a2$, such extension projecting through one gear of the pair of gear $g$ which, as in Fig. 3, connects the flywheel $m1$ with the secondary shaft $v$ for simultaneous and proportional rotation. The flywheel $m2$ is fixed to the extension $a'2$ and is located between the primary flywheel $m1$ and the pair of gears $g$, the flywheel $m1$ and the associated gear of the pair $g$ being connected by a hollow shaft, such as shaft 24 in Fig. 1, such hollow shaft being connected to flywheel $m1$ by a plate $a'1$, such as cover 42 in Fig. 1.

Also, in a transmission including a secondary shaft, such as shaft $v$, on which the friction clutches are mounted it would be desirable to connect the flywheels with the friction clutch elements directly. Since that is not possible, however, because of the limited space available in the vicinity of the multi-disk friction clutches $k1$, $k2$, particularly since the space available in an automobile transmission is limited by the floor of the automobile or the permissible minimum road clearance, it is of particular advantage to dispose the flywheels between the other elements of the transmission and the engine. Where the transmission is mounted in the vicinity of the rear axle of the motor vehicle, however, it is preferable to dispose the flywheels at the other end of the transmission.

In the embodiment illustrated in Fig. 5, the secondary flywheel $m2$ is positioned in front of the flywheel $m1$, the extension $a'2$ of the driven shaft projecting through the hollow shaft $a'1$ carrying the flywheel $m1$. The secondary flywheel $m2$ is thus positioned between the disk $a''1$, connected to the engine and the primary flywheel $m1$. The clutch $k1$ is mounted on the driven shaft 2 rather than on the secondary shaft $v$.

The flywheel $m1$ may be formed by that of the engine. In the embodiment illustrated in Figs. 3, 4 and 5 the flywheel may be formed by the members of a hydrodynamic clutch or torque converter, the turbine wheel of the clutch or converter constituting the flywheel for the associated friction clutches $k1$ and $k2$.

Moreover, the flywheel $m2$ may be used as a scooping member for the scooping of the liquid out of the hydrodynamic device, as in Figs. 4 and 5. Thus, the flywheel may serve the dual function of precluding the chattering of the friction clutches and the undesirable oscillations. Also, the flywheel may itself constitute a vibration absorber, as described with reference to Fig. 1. Where the flywheel serves as a scooping member, as in Fig. 1, it is possible by properly proportioning the same to keep space C in Fig. 1 in which the flywheel formed by the elements 128 and 140 revolves empty of liquid whereby eddy current losses and friction losses will be reduced which otherwise would arise from the rotation of the flywheel in the liquid. Such losses may be also reduced by providing the flywheel with an oil-repelling coating, such as a chromium plating.

The effect of the two flywheels $m1$ and $m2$ is based on the fact that when the coefficient of friction in the multi-disk friction clutch varies as it happens during the transition from a relative rest of the friction disks to a relative rotation, the couples acting on the elements of the friction clutch will be immediately changed accordingly so that there will be no interval of time between the change of the coefficient of friction and a change of the couple transferred.

While I have described my invention with reference to a number of preferred embodiments thereof, I wish it to be clearly understood that the same is in no way limited to such details, but is capable of numerous modifications within the scope of the appended claims.

What I claim is:

1. In an automobile transmission, the combination comprising input means, output means, a plurality of sets of gears and at least one friction clutch engageable for transmitting driving torque and coordinated to one of said sets of gears and adapted to be engaged and disengaged to thereby determine the ratio of transmission, said friction clutch being composed of a rotary driving member and of a rotary driven member, first inelastic torque-transmitting means connecting said input means to said driving member, second inelastic torque-transmitting means connecting said driven member to said output means, a pair of flywheels, means operatively connecting one of said flywheels to one of the two parts consisting of said driving member and said first inelastic torque-transmitting means, means operatively connecting the other one of said flywheels to one of the two parts consisting of said driven member and said second inelastic torque-transmitting means to provide common rotation between said one flywheel and said driving member and between said other flywheel and said driven member regardless of load conditions in said transmission whereby said flywheels will counteract any tendency of said friction clutch to chatter during engagement thereof under driving torque load.

2. In an automobile transmission, the combination comprising a driving shaft, a driven shaft, a plurality of sets of gears adapted to selectively transmit power between said shafts at different ratios of transmission, a plurality of friction clutches for transmitting driving torque between said driving shaft and said driven shaft upon engagement thereof and adapted to be engaged and to be disengaged and coordinated to said sets of gears to render the same active or inactive to transmit power, one of said clutches being adapted to directly connect said driving shaft to said driven shaft, each of said clutches being composed of a driving member and of a driven member, flywheels, and means for counteracting a tendency of one of said clutches operatively connected with the driving member thereof to said driving shaft and with the driven member thereof operatively connected with said driven shaft to chatter during engagement of said last-mentioned clutch under driving torque loads including means for operatively connecting the driving member of said last-mentioned clutch to one of said flywheels and means for operatively connecting the driven member of said last-mentioned clutch to another one of said flywheels to provide common rotation between said one flywheel and said driving member and between said other flywheel and said driven member irrespective of load conditions in said transmission.

3. The combination claimed in claim 2 comprising in addition a secondary shaft extending parallel to said driving shaft and to said driven shaft and carrying some of said gears and at least one of said clutches, said flywheels being mounted for rotation about the common axis of said driving shaft and said driven shaft.

4. The combination claimed in claim 3 in which one of said flywheels is mounted on said driving shaft for common rotation therewith, and in which another one of said flywheels is mounted on said driven shaft for common rotation therewith.

5. The combination claimed in claim 2 in which two of said flywheels constitute the driving element and the driven element of a main clutch, said main clutch being adapted to transmit power from said driving shaft to said plurality of sets of gears, said driven shaft extending into the vicinity of said main clutch, one of said flywheels being disposed in the vicinity of said driving shaft and connected with said driven shaft for common rotation therewith.

6. An automobile transmission comprising a driving shaft, a driven shaft, a secondary shaft, a plurality of sets of gears selectively adapted to transmit power from said secondary shaft to said driven shaft, means for transmitting power from said driving shaft to said secondary shaft, said means including a main clutch composed of a driving element and a driven element, a plurality of friction clutches individually coordinated to said sets of gears and adapted to be engaged and to be disengaged to thereby selectively render said sets of gears active to transmit power, a friction clutch adapted to directly connect said driving shaft to said driven shaft when said plurality of friction clutches are disengaged, and a plurality of flywheels, two of said flywheels being constituted by said driving element and said driven element of said main clutch, and another one of said flywheels different from said last-mentioned two flywheels which are constituted by said driving element and said driven element being operatively connected for common rotation with said driven shaft.

7. The transmission claimed in claim 6 in which said driving shaft, said driven shaft, said main clutch, and said one of said flywheels are coaxially disposed.

8. The transmission claimed in claim 7 in which said main coupling is a hydrodynamic clutch, said driving element and said driven element thereof forming an annular working chamber being provided with vanes therein.

9. A transmission comprising a driving shaft and a driven shaft disposed in coaxial relationship, a secondary shaft, mounting means for mounting said secondary shaft in spaced parallel relationship to said driven shaft, a plurality of sets of gears mounted on said secondary shaft and said driven shaft and adapted to selectively transfer power therebetween at different speed ratios, multi-disk friction clutches individually associated to said sets of gears and adapted to be engaged and to be disengaged for rendering said sets selectively active or inactive to transmit power, said clutches transferring driving torque between said driving shaft and said driven shaft during engagement thereof, a hydrodynamic clutch composed of a driving element and a driven element both shaped to include an annular working chamber, said driving element being fixed to said driving shaft, means for operatively connecting said driven element of said hydrodynamic clutch to said secondary shaft, said means including a hollow shaft mounted on said driven shaft for independent rotation and a pair of gears fixed to said hollow shaft and to said secondary shaft, an additional multi-disk friction clutch adapted to transmit power between said driving element of said hydrodynamic clutch and said driven shaft for the purpose of bypassing said hydrodynamic clutch when said first mentioned multi-disk friction clutches are disengaged, a flywheel arranged on said driven shaft, and frictional vibration-absorbing means frictionally connecting said driven shaft to said flywheel.

10. The transmission claimed in claim 9 in which said hydrodynamic clutch is provided with a chamber communicating with said working chamber for the reception of liquid therefrom and accommodating said flywheel, the latter being provided with scooping ducts adapted to scoop liquid out of said chamber, and a pump for feeding liquid to said chamber.

11. The transmission claimed in claim 9 in which said flywheel is provided with an oil-repelling coating.

12. The transmission claimed in claim 9 in which said flywheel is chromium-plated.

13. In a multi-speed transmission comprising input means, output means, a plurality of gear means, means including selectively engageable friction clutch means for connecting said input means with said output means through said gear means and for selectively determining the transmission ratio of the transmission, said friction clutch means comprising a driving member operatively connected with said input means and a driven member operatively connected with said output means, and means including flywheels operatively and direct actingly connected with said clutch members to prevent chattering of said clutch means during engagement thereof under load to effect transmission of driving torque therethrough between said input means and said output means.

14. In a multi-speed transmission comprising input means, output means, a plurality of gear means, means including selectively engageable friction clutch means for connecting said input means with said output means through said gear means and for selectively determining the transmission ratio of the transmission, said friction clutch means comprising a driving member operatively connected with said input means and a driven member operatively connected with said output means, and means including flywheels operatively and direct actingly connected with said clutch means through said gear means to prevent chattering of said clutch means during engagement thereof under load to effect transmission of driving torque therethrough between said input means and said output means.

15. In a multi-speed transmission comprising input means, output means, a plurality of gear means, means including selectively engageable friction clutch means for connecting said input means with said output means through said gear means and for selectively determining the transmission ratio of the transmission, said friction clutch means comprising a driving member operatively connected with said input means and a driven member operatively connected with said output means, means including flywheels operatively and direct actingly connected with said clutch means to prevent chattering of said clutch means during engagement thereof under load to effect transmission of driving torque therethrough between said input means and said output means, and a hydrodynamic device having movable parts interposed between said input means and said gear means, wherein one of said flywheels is formed by one of said movable parts.

16. In a multi-speed transmission comprising input means, output means, a plurality of gear means, means including selectively engageable friction clutch means for connecting said input means with said output means through said gear means and for selectively determining the transmission ratio of the transmission, said friction clutch means comprising a driving member operatively connected with said input means and a driven member operatively connected with said output means, and means including flywheels operatively and direct actingly connected with said clutch means to prevent chattering of said clutch means during engagement thereof under load to effect transmission of driving torque therethrough between said input means and said output means, one of said fly-wheels being connected with said clutch means through said output means.

17. The combination according to claim 16, wherein the other of said flywheels is permanently and operatively connected with said clutch means through some of said gear means.

18. In a multi-speed transmission comprising input means, output means, a plurality of gear means, means including selectively engageable friction clutch means for connecting said input means with said output means through said gear means and for selectively determining the transmission ratio of the transmission, said friction clutch means comprising a driving member operatively connected with said input means and a driven member operatively connected with said output means, means including flywheels operatively and direct actingly connected with said clutch means to prevent chattering of said clutch means during engagement thereof under load to effect transmission of driving torque therethrough between said input means and said output means, a hydrodynamic device interposed between said input means and said gear means, and means for selectively coupling said input means to said output means in by-passing relationship with said hydrodynamic device, said last-mentioned selective coupling means including vibration absorbing means.

19. The combination according to claim 18, wherein said hydrodynamic device includes movable parts constituting said flywheels.

20. In a multi-speed transmission comprising input means, output means, a plurality of gear means, means including selectively engageable friction clutch means each consisting of two halves for connecting said input means with said output means through said gear means and for selectively determining the transmission ratio of the transmission, and means including a flywheel operatively and direct actingly connected with each half of said clutch means to prevent chattering of said clutch means during engagement thereof under load to effect transmission of driving torque therethrough between said input means and said output means.

21. In a multi-speed transmission comprising input means, output means, a plurality of gear means, means including selectively engageable friction clutch means each consisting of two halves for connecting said input means with said output means through said gear means and for selectively determining the transmission ratio of the transmission, and means including flywheels operatively and direct actingly connected with said clutch means to prevent chattering of said clutch means during engagement thereof under load to effect transmission of driving torque therethrough between said input means and said output means, one of said flywheels being connected with one half of each clutch means through said output means, and the other of said flywheels being connected with the other half of each clutch means through some of said gear means.

22. In an automobile transmission, the combination according to claim 1 wherein one of said flywheels forms a unitary structure with the part to which it is connected.

References Cited in the file of this patent

UNITED STATES PATENTS

| 1,859,607 | Sinclair | May 24, 1932 |
| 2,050,550 | Yingling | Aug. 11, 1936 |
| 2,206,409 | Kummich | July 2, 1940 |
| 2,467,829 | Hornbostel | Apr. 19, 1949 |
| 2,669,131 | Gerst | Feb. 16, 1954 |
| 2,747,430 | Forster et al. | May 29, 1956 |

FOREIGN PATENTS

| 894,119 | France | Dec. 14, 1944 |